United States Patent
Yang

(10) Patent No.: US 8,208,071 B2
(45) Date of Patent: Jun. 26, 2012

(54) METHOD FOR DETERMINING THE ASPECT RATIO AND AN IMAGE APPARATUS USING THE SAME

(75) Inventor: Deok-jin Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1123 days.

(21) Appl. No.: 12/026,163

(22) Filed: Feb. 5, 2008

(65) Prior Publication Data

US 2009/0027550 A1  Jan. 29, 2009

(30) Foreign Application Priority Data

Jul. 25, 2007 (KR) .................. 10-2007-0074675

(51) Int. Cl.
 *H04N 5/46* (2006.01)
(52) U.S. Cl. ........................... 348/558; 348/194
(58) Field of Classification Search .............. None
See application file for complete search history.

(56) References Cited

U.S. PATENT DOCUMENTS

| | | | | |
|---|---|---|---|---|
| 5,029,007 A * | 7/1991 | Spiero | .................. | 348/556 |
| 7,633,340 B2 * | 12/2009 | Ke et al. | .................. | 330/250 |
| 7,812,888 B2 | 10/2010 | Kataoka | | |
| 7,834,934 B2 * | 11/2010 | Ochi | .................. | 348/556 |
| 2007/0064154 A1 | 3/2007 | Chen | | |
| 2007/0070202 A1 * | 3/2007 | Kataoka | .................. | 348/194 |

FOREIGN PATENT DOCUMENTS

| | | |
|---|---|---|
| CN | 1738360 A | 2/2006 |
| CN | 1960436 A | 5/2007 |
| EP | 0878968 A2 | 11/1998 |
| EP | 1798965 A2 | 6/2007 |
| JP | 09-139896 A | 5/1997 |
| KR | 10-2005-0000026 A | 1/2005 |
| KR | 10-2006-0104702 A | 10/2006 |
| WO | 97/41664 A2 | 11/1997 |

OTHER PUBLICATIONS

Communication issued on Oct. 19, 2011 by the State Intellectual Property Office of the P.R. of China in the counterpart Chinese Patent Application No. 200810099096.6.
Communication issued on Oct. 27, 2011 by the Korean Intellectual Property Office in the counterpart Korean Patent Application No. 10-2007-0074675.

* cited by examiner

*Primary Examiner* — Kristine Kincaid
*Assistant Examiner* — Oschta Montoya
(74) *Attorney, Agent, or Firm* — Sughrue Mion, PLLC

(57) ABSTRACT

A method for determining the aspect ratio of an image signal and an image apparatus using the same is provided. The image apparatus includes a sync signal separation unit which separates a sync signal from an image signal, an aspect ratio determination unit which determines an aspect ratio of the image signal using a voltage level of the separated sync signal, and a signal processing unit which processes the image signal according to the aspect ratio.

9 Claims, 5 Drawing Sheets

METHOD FOR DETERMINING THE ASPECT RATIO AND AN IMAGE APPARATUS USING THE SAME

CROSS-REFERENCE TO RELATED APPLICATIONS

This application claims priority from Korean Patent Application No. 10-2007-0074675, filed on Jul. 25, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to controlling an image apparatus, and more particularly, to determining the aspect ratio of an image signal.

2. Description of the Related Art

Image apparatuses reproduce and record broadcasts, images recorded in recording media, and images transmitted from external devices.

Formats of image signals reproduced by image apparatuses include a standard definition (SD) format and a high definition (HD) format. Image signals of SD format are broadcast or recorded at an aspect ratio of 4:3 (width:height), and image signals of HD format are broadcast or recorded at an aspect ratio of 16:9. Accordingly, if image signals recorded in SD format are reproduced at an aspect ratio of 16:9, distorted images which appear to be stretched horizontally are displayed. Likewise, if image signals recorded in HD format are reproduced at an aspect ratio of 4:3, distorted images are displayed.

However, as a practical matter, it is difficult for users to determine whether viewing images are SD format or HD format and to adjust the aspect ratio. Therefore, there is a need for methods for automatically reproducing images at a suitable aspect ratio.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides an image apparatus which reproduces image signals at a different aspect ratio according to whether an image signal is in SD format or HD format, and a controlling method thereof.

According to an exemplary aspect of the present invention, there is provided an image apparatus including a sync signal separation unit which separates a sync signal from an image signal, an aspect ratio determination unit which determines the aspect ratio of the image signal using the voltage level of the separated sync signal, and a signal processing unit which processes the image signal according to the determined image ratio.

The aspect ratio determination unit determines that the aspect ratio of the image signal is a first aspect ratio if the voltage level of the sync signal is higher than a threshold voltage level, and the aspect ratio determination unit determines that the aspect ratio of the image signal is a second aspect ratio if the voltage level of the sync signal is lower than the threshold voltage level.

The aspect ratio determination unit determines the aspect ratio of the image signal using the frequency of the sync signal.

The aspect ratio determination unit determines the aspect ratio of the image signal using the voltage level of the sync signal if the aspect ratio of the image signal is not able to be determined using the frequency of the sync signal.

The sync signal is a horizontal sync signal.

According to another exemplary aspect of the present invention, there is provided a method for determining the aspect ratio including receiving an image signal, separating a sync signal from an image signal, determining the aspect ratio of the image signal using the voltage level of the separated sync signal, and processing the image signal according to the determined image ratio.

In the determination of the aspect ratio, the aspect ratio of the image signal is determined to be a first aspect ratio if the voltage level of the sync signal is higher than a threshold voltage level, and the aspect ratio of the image signal is determined to be a second aspect ratio if the voltage level of the sync signal is lower than the threshold voltage level.

In the determination of the aspect ratio, the aspect ratio of the image signal is determined using the frequency of the sync signal.

In the determination of the aspect ratio, the aspect ratio of the image signal is determined using the voltage level of the sync signal if the aspect ratio of the image signal is not able to be determined using the frequency of the sync signal.

The sync signal is a horizontal sync signal.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
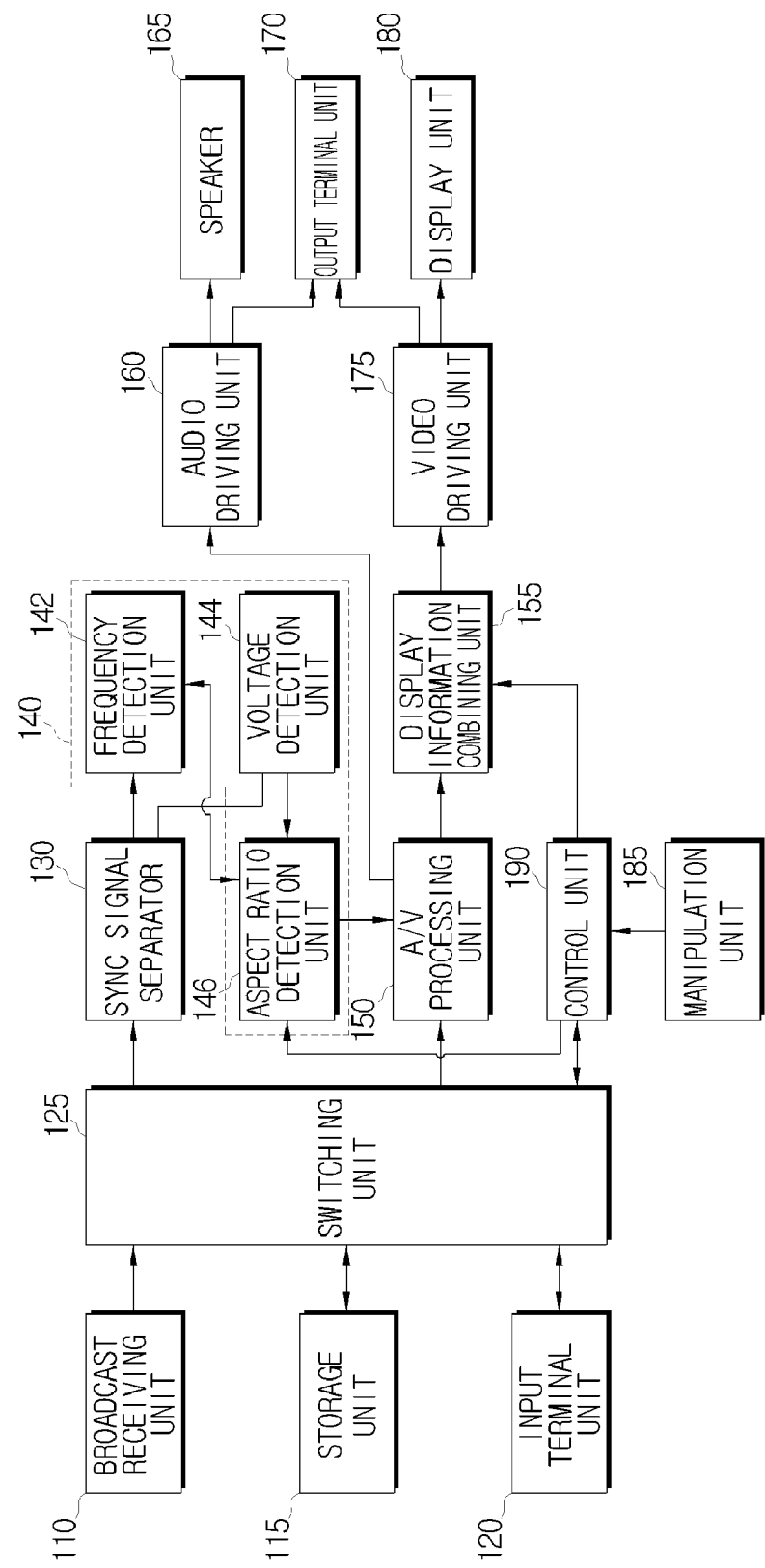
FIG. 1 is a block diagram of an image apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram of an image apparatus according to an exemplary embodiment of the present invention. As shown in FIG. 1, the image apparatus includes a broadcast receiving unit 110, a storage unit 115, an input terminal unit 120, a switching unit 125, a sync signal separator 130, an aspect ratio determination unit 140, an audio/video (A/V) processing unit 150, a display information combining unit 155, a video driving unit 175, a display unit 180, an output terminal unit 170, an audio driving unit 160, a speaker 165, a manipulation unit 185, and a control unit 190.

The broadcast receiving unit 110 tunes to a television broadcast and demodulates the broadcast. The storage unit 115 stores motion pictures, or reads the stored motion pictures. The storage unit 115 may use various kinds of recording media, such as a hard disk drive (HDD), to store motion pictures.

The input terminal unit 120 provides a communication interface in order to connect and communicate with external devices, such as a computer, a camera, a camcorder, a digital video disk (DVD) player, an HDD player, and a memory card. However, these external devices are just examples, and any kind of device having a recording medium to record motion pictures can be used as the external device.

The switching unit 125 performs switching in order for a signal output from the broadcast receiving unit 110, the storage unit 115, or the input terminal unit 120 to be transmitted to the A/V processing unit 150 and the sync signal separation unit 130. The switching unit 125 is operated by the control unit 190.

The sync signal separation unit 130 separates a horizontal sync signal from an image signal, and transmits the horizontal sync signal to the aspect ratio determination unit 140.

The aspect ratio determination unit 140 determines the aspect ratio of the image signal using a frequency or a voltage level of the horizontal sync signal, and includes a frequency detection unit 142, a voltage detection unit 144. The aspect ratio determination unit 140 an aspect ratio detection unit 146.

The frequency detection unit 142 detects the frequency of the horizontal sync signal, and transmits the detected frequency to the aspect ratio detection unit 146. The voltage detection unit 144 determines whether the voltage level of the horizontal sync signal is higher than a threshold voltage level, and transmits the determination result to the aspect ratio detection unit 146. The aspect ratio detection unit 146 determines the aspect ratio of the image signal using the determination result received from the frequency detection unit 142 and the voltage detection unit 144, and controls the A/V processing unit 150 in order for the image signal to be processed at the determined aspect ratio. In particular, if the aspect ratio is not determined using the detection result received from the frequency detection unit 142, the aspect ratio detection unit 146 transmits a control signal to the voltage detection unit 144 so as to determine whether the voltage level of the horizontal sync signal is higher than the threshold voltage level.

The following example shows the process of the aspect ratio detection unit 146 determining the aspect ratio of an image signal. SD format includes a 480I format and a 480P format, and HD format includes a 480P format and a 720P format. The frequency of the 480I format of SD format is 15.75 kHz, the frequency of the 480P format of SD format and HD format is 31 kHz, and the frequency of the 720P format of HD format is 45 kHz. For example, if the frequency received from the frequency detection unit 142 is 15.75 kHz, the aspect ratio detection unit 146 determines that the aspect ratio is 4:3 since image signals in HD format do not have a frequency of 15.75 kHz. If the frequency received from the frequency detection unit 142 is 45 kHz, the aspect ratio detection unit 146 determines that the aspect ratio is 16:9 since image signals in SD format do not have a frequency of 45 kHz.

If the frequency received from the frequency detection unit 142 is 31 kHz, the aspect ratio determination unit 140 transmits a control signal to detect the voltage level of the sync signal to the voltage detection unit 144, since the image signal may be in either SD format or HD format. If the voltage detection unit 144 determines that the voltage level of the horizontal sync signal is higher than the threshold voltage level, the aspect ratio determination unit 140 determines that the aspect ratio is 16:9, and if the voltage detection unit 144 determines that the voltage level of the vertical horizontal sync signal is lower than the threshold voltage level, the aspect ratio determination unit 140 determines that the aspect ratio is 4:3.

The A/V processing unit 150 processes an image signal (a video signal and/or an audio signal) received from the switching unit 125 to be reproduced. The A/V processing unit 150 processes the image signal according to the aspect ratio received from the aspect ratio determination unit 140. The A/V processing unit 150 transmits a video signal and an audio signal to the display information combining unit 155 and the audio driving unit 160, respectively.

The display information combining unit 155 combines display information such as text, marks, figures, or graphics with a video output from the A/V processing unit 150, using on-screen display method. The display information combining unit 155 is operated by the control unit 190.

The video driving unit 175 outputs the video combined with the display information on the display unit 180, or transmits the video combined with the display information to an external device (not shown) connected via the output terminal unit 170.

The audio driving unit 160 outputs an audio output from the A/V processing unit 150 to the speaker 165, or transmits the audio to an external device (not shown) connected via the output terminal unit.

The manipulation unit 185 receives user commands and transmits the user commands to the control unit 190. The manipulation unit 185 may be integrated with the image apparatus or split from the image apparatus. In addition, the manipulation unit 185 may be implemented with a remote control to input user commands and a light receiving unit to receive signals output from the remote control and transmit signals to the control unit 190. Furthermore, the manipulation unit 185 may be implemented with a user interface to input user commands using a menu screen.

The control unit 190 controls the operation of the image apparatus according to the user commands input using the manipulation unit 185. If the user inputs a command to change the aspect ratio using the manipulation unit 185, the control unit 190 controls the image apparatus to output the image signal at an aspect ratio which is different from the aspect ratio being displayed on the display unit.

Figure 2:
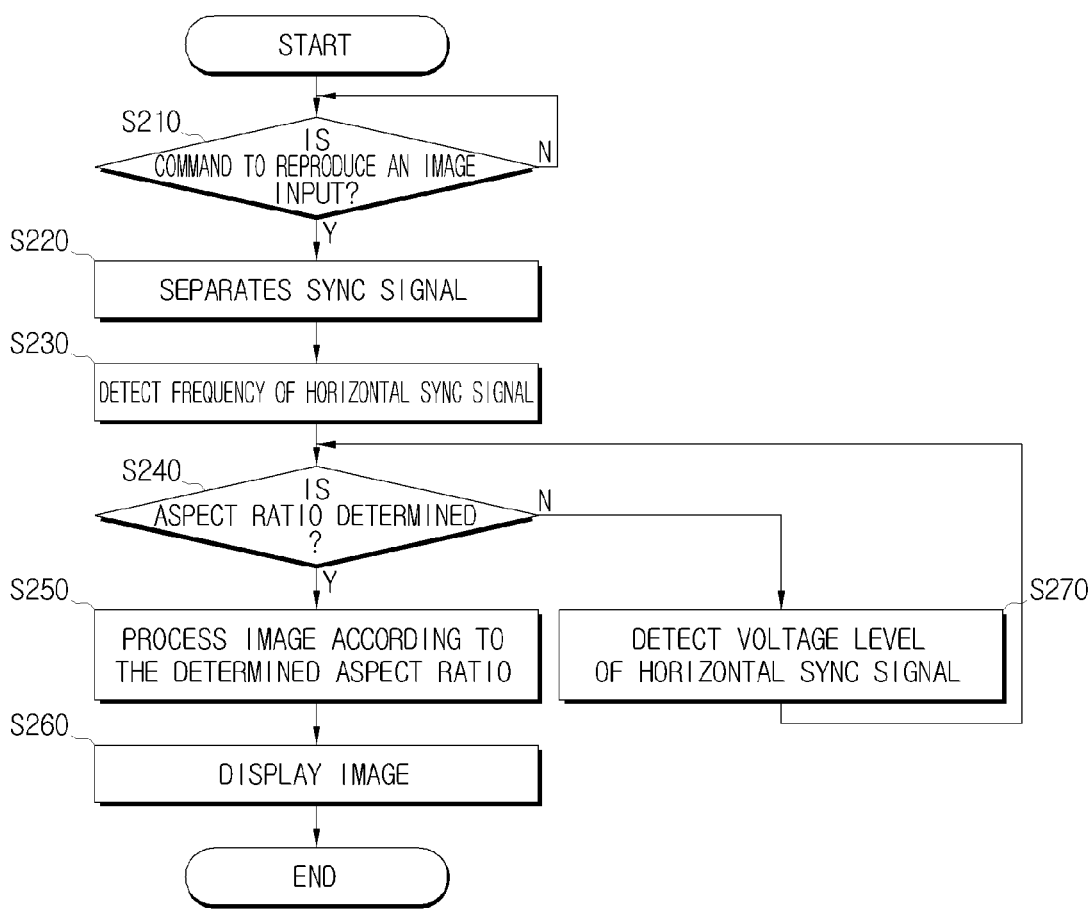
FIG. 2 is a flow chart illustrating a method for determining the aspect ratio according to an exemplary embodiment of the present invention.
Figure 3A:
FIGS. 3A to 3D are drawings provided to explain the flow chart of FIG. 2.

The process of determining the aspect ratio is described below in detail with reference to FIGS. 2 to 4B. FIG. 2 is a flow chart illustrating a method for determining the aspect ratio according to an exemplary embodiment of the present invention, FIGS. 3A to 3D are drawings provided to explain the flow chart of FIG. 2, and FIGS. 4A and 4B show images displayed on the display unit 180 according to the determined aspect ratio.

As shown in FIG. 2, if a command to reproduce an image is input in operation S210-Y, the sync signal separation unit 130 separates a sync signal from an image signal input to the image apparatus in operation S220. The sync signal separation unit 130 may separate a horizontal sync signal during the separation.

The frequency detection unit 142 detects the frequency of the separated horizontal sync signal in operation S230. The frequency detection unit 142 can detect the frequency of the horizontal sync signal by measuring the number of troughs in a waveform of the sync signal during a certain length of time.

In operation S240, the aspect ratio detection unit 146 receives the detected frequency from the frequency detection unit 142, and determines whether the aspect ratio can be determined using the frequency. As shown in FIG. 3A, if the frequency of the sync signal received from the frequency detection unit 142 is 15.75 kHz, the aspect ratio detection unit 146 determines that the image signal is an image signal in SD format and the aspect ratio is 4:3, since image signals in HD format do not have a frequency of 15.75 kHz. In addition, as shown in FIG. 3D, if the frequency of the sync signal received from the frequency detection unit 142 is 45 kHz, the aspect ratio detection unit 146 determines that the image signal is an image signal in HD format and the aspect ratio is 16:9, since image signals in SD format do not have a frequency of 45 kHz.

If the aspect ratio is determined in operation S240-Y, the A/V processing unit 150 processes the image using the determined aspect ratio in operation S250. The aspect ratio detection unit 146 transmits the determined aspect ratio to the A/V processing unit 150, and the A/V processing unit 150 processes the image signal using the determined aspect ratio.

The processed image is displayed in operation S260. If the frequency is 15.75 kHz, and the aspect ratio is determined to be 4:3, the image is displayed as shown in FIG. 4B. If the frequency is 45 kHz, and the aspect ratio is determined to be 16:9, the image is displayed as shown in FIG. 4A.

If the aspect ratio detection unit 146 determines that the aspect ratio cannot be determined using the frequency in operation S240-N, the aspect ratio detection unit 146 transmits a control signal to determine the voltage level of the vertical horizontal sync signal to the voltage detection unit 144, and the voltage detection unit 144 detects the voltage level of the horizontal sync signal in operation S270. The voltage detection unit 144 determines whether the voltage level of the horizontal sync signal is higher than the threshold voltage level, and transmits the determination result to the aspect ratio detection unit 146.

Figure 3B:
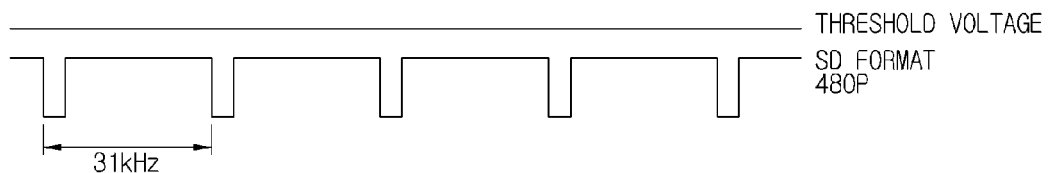
Figure 3C:
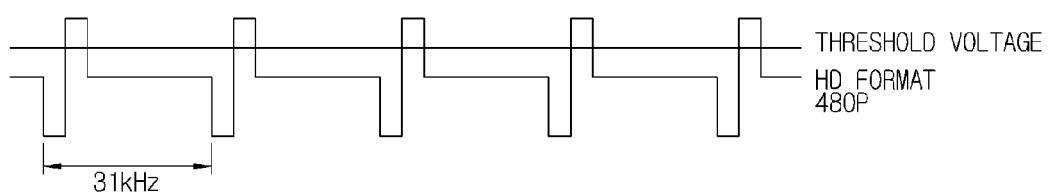
Figure 3D:
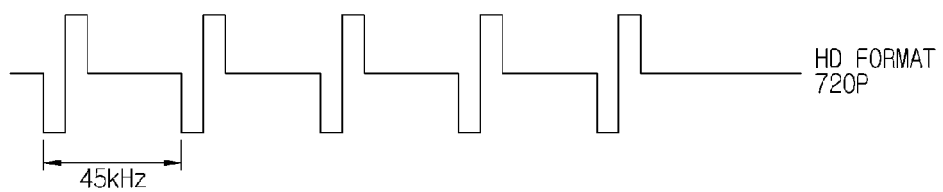
Figure 4A:
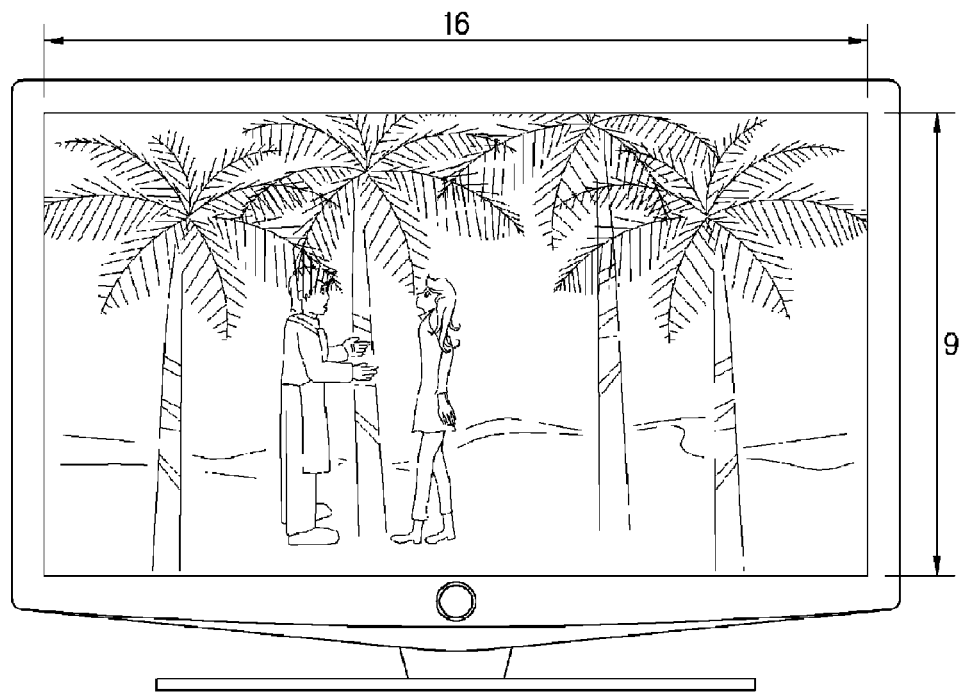
FIGS. 4A and 4B show images displayed on a display unit according to the determined aspect ratio.
Figure 4B:
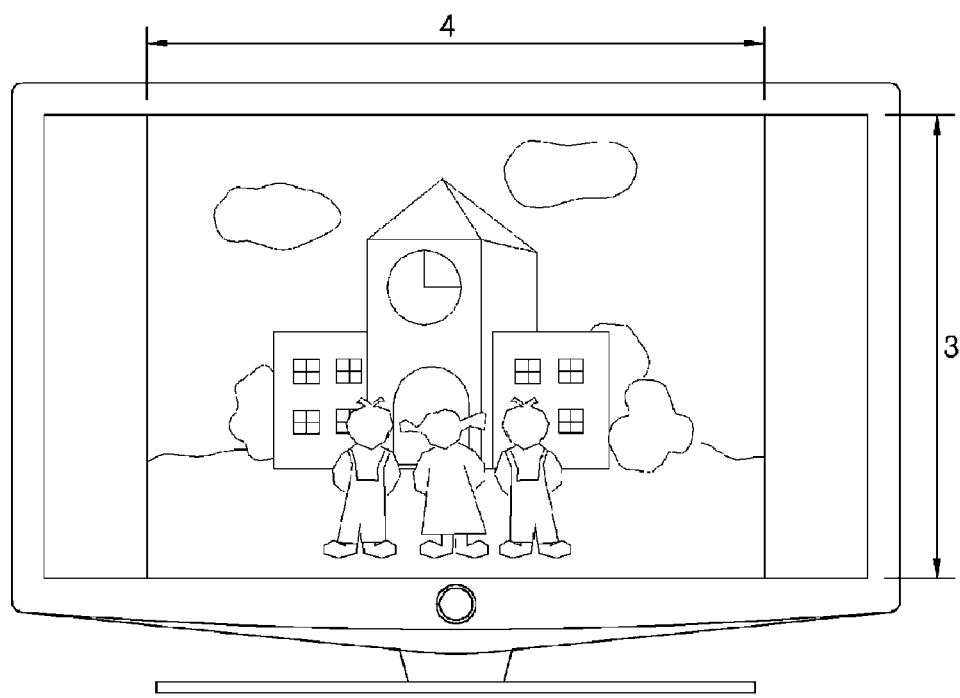

For example, if the frequency is 31 kHz, the aspect ratio detection unit 146 determines that the aspect ratio cannot be determined since the sync signal of 480P in SD format as shown in FIG. 3B and the sync signal of 480P in HD format as shown in FIG. 3C have a frequency of 31 kHz. As a result, the aspect ratio determination unit 140 cannot determine the aspect ratio using the frequency. However, if the preset threshold voltage level is 180 mV, and the voltage level of HD format is 273 mV, the voltage level of HD format is higher than the preset threshold voltage level. If the sync signal of HD format is input as shown in FIG. 3B, the voltage detection unit 144 transmits to the aspect ratio detection unit 146 the result that the voltage level of the sync signal is higher than the preset threshold voltage level. However, if the sync signal of SD format having the voltage level of 0 mV is input as in FIG. 3C, the voltage detection unit 144 transmits to the aspect ratio detection unit 146 the result that the voltage level of the sync signal is lower than the preset threshold voltage level.

The aspect ratio detection unit 146 determines the aspect ratio using the detection result received from the voltage detection unit 144. That is, if the aspect ratio detection unit 146 receives from the voltage detection unit 144 the result that the voltage level of the sync signal is higher than the preset threshold voltage level, the aspect ratio detection unit 146 determines that the aspect ratio is 16:9. If the aspect ratio detection unit 146 receives from the voltage detection unit 144 the result that the voltage level of the sync signal is lower than the preset threshold voltage level, the aspect ratio detection unit 146 determines that the aspect ratio is 4:3.

Therefore, the image is processed according to the determined aspect ratio in operation S250, and is displayed in operation S260.

As described above, images are automatically reproduced at the original aspect ratio, so distortion of the images is prevented. In the above exemplary embodiment, a method for automatically reproducing images according to the original aspect ratio is explained but users can personally adjust the aspect ratio. If a user inputs a command to change the aspect ratio using the manipulation unit 185, the control unit 190 transmits a control signal corresponding to the command to the aspect ratio detection unit 146. The aspect ratio detection unit 146 transmits the control signal of the aspect ratio, which is different from the aspect ratio determined by the aspect ratio detection unit 146, to the A/V processing unit 150. For example, the aspect ratio detection unit 146 determines that the aspect ratio is 4:3, but if the aspect ratio detection unit 146 receives a control signal to change the aspect ratio from the control unit 190, a control signal to change the aspect ratio to 16:9 is transmitted to the A/V processing unit 150. Accordingly, users can have the benefit of viewing images at the desired aspect ratio.

Another exemplary embodiment is described below in detail with reference to FIGS. 5 to 6.

Figure 5:
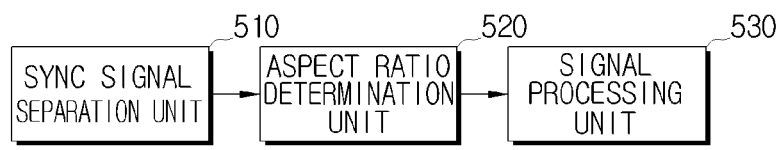
FIG. 5 is a block diagram of an image apparatus according to another exemplary embodiment of the present invention.

In FIG. 5, an image apparatus which determines the aspect ratio according to another exemplary embodiment of the present invention includes a sync signal separation unit 510 which separates a sync signal from an image signal, an aspect ratio determination unit 520 which determines the aspect ratio of the image signal using the voltage level of the separated sync signal, and a signal processing unit 530 which processes the image signal at the determined aspect ratio.

Figure 6:
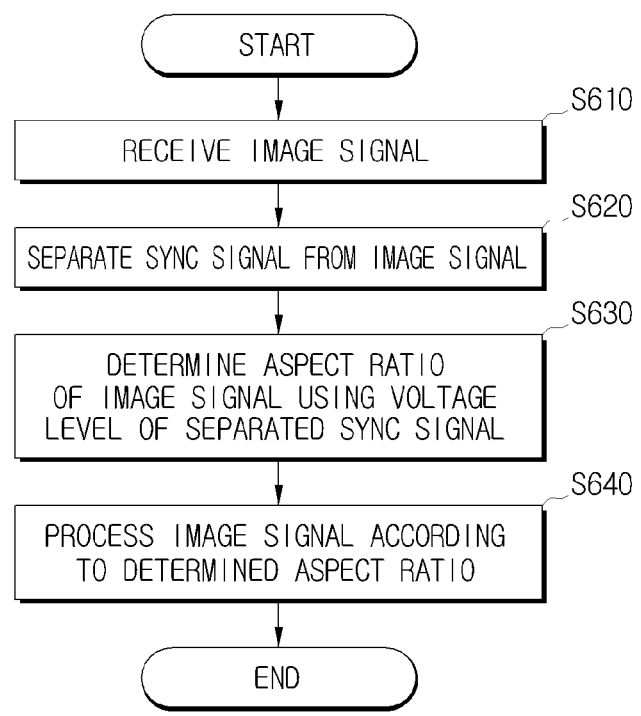
FIG. 6 is a flow chart illustrating a method for determining the aspect ratio according to another exemplary embodiment of the present invention.

In FIG. 6, a method for determining the aspect ratio according to another exemplary embodiment of the present invention includes receiving an image signal (S610), separating a sync signal from the image signal (S620), determining the aspect ratio of the image signal using the voltage level of the separated sync signal (S630), and processing the image signal at the determined aspect ratio (S640). Accordingly, the image apparatus reproduces the image signal at a suitable aspect ratio.

As can be appreciated from the above description, whether an image signal is SD format or HD format is determined using the characteristics of a sync signal of the image signal, and the image signal is reproduced at a suitable aspect ratio according to the determined format. Consequently, users can view undistorted images.

Furthermore, the aspect ratio is automatically determined according to the format of the image signal, so user convenience is enhanced.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image apparatus comprising:

a sync signal separation unit which separates a sync signal from an image signal;

an aspect ratio determination unit which determines an aspect ratio of the image signal based on a frequency of the sync signal and determines the aspect ratio of the image signal based on a voltage level of the sync signal separated by the sync signal separation unit if the aspect ratio of the image signal is not able to be determined using the frequency of the sync signal; and a signal processing unit which processes the image signal according to the aspect ratio determined by the aspect ratio determination unit.

2. The image apparatus of claim 1, wherein the aspect ratio determination unit determines that the aspect ratio of the image signal is a first aspect ratio if the voltage level of the sync signal is higher than a threshold voltage level, and the aspect ratio determination unit determines that the aspect ratio of the image signal is a second aspect ratio if the voltage level of the sync signal is lower than the threshold voltage level.

3. The image apparatus of claim 1, wherein the sync signal is a horizontal sync signal.

4. The image apparatus of claim 1, wherein the aspect ratio determination unit determines the aspect ratio of the image signal based on the voltage level of the sync signal unless the aspect ratio determination unit has already determined the aspect ratio of the image signal based on the frequency of the sync signal.

5. The image apparatus of claim 1, wherein the aspect ratio determination unit determines the aspect ratio to correspond to a high definition (HD) format if the voltage level of the sync signal is higher than a threshold voltage level, the aspect ratio determination unit determines the aspect ratio of the image signal to correspond to a standard definition (SD) format if the voltage level of the sync signal is lower than the threshold voltage level, and the signal processing unit which processes the image signal according to the determined aspect ratio, in the HD format or the SD format.

6. A method for determining an aspect ratio, the method comprising:

receiving an image signal;

separating a sync signal from an image signal;

determining an aspect ratio of the image signal based on a frequency of the sync signal and determining the aspect ratio of the image signal based on a voltage level of the sync signal if the aspect ratio of the image signal is not able to be determined using the frequency of the sync signal; and processing the image signal according to the image ratio.

7. The method of claim 6, wherein in the determining the aspect ratio, the aspect ratio of the image signal is determined to be a first aspect ratio if the voltage level of the sync signal is higher than a threshold voltage level, and the aspect ratio of the image signal is determined to be a second aspect ratio if the voltage level of the sync signal is lower than the threshold voltage level.

8. The method of claim 6, wherein the sync signal is a horizontal sync signal.

9. A method for determining an aspect ratio, the method comprising:

receiving an image signal;

separating a sync signal from the image signal;

determining an aspect ratio of the image signal based on a frequency of the sync signal and determining the aspect ratio of the image signal based on a voltage of the sync signal if the aspect ratio of the image signal is not able to be determined using the frequency of the sync signal; and processing the image signal according to the aspect ratio by using at least one of a frequency and a voltage of the sync signal.

* * * * *